July 10, 1945.   R. R. KILIAN   2,380,315
DOUBLE ACTING RECIPROCATING AIR MOTOR
Filed March 21, 1944   3 Sheets-Sheet 1

INVENTOR.
Rudolf R Kilian
BY Bodell-Thompson
attys.

July 10, 1945.  R. R. KILIAN  2,380,315

DOUBLE ACTING RECIPROCATING AIR MOTOR

Filed March 21, 1944  3 Sheets-Sheet 3

INVENTOR.
Rudolph R. Kilian
BY Bodell-Thompson
attys.

Patented July 10, 1945

2,380,315

UNITED STATES PATENT OFFICE 2,380,315

DOUBLE ACTING RECIPROCATING AIR MOTOR

Rudolph R. Kilian, Baldwinsville, N. Y., assignor to Rollway Bearing Co., Inc., Syracuse, N. Y., a corporation of New York Application March 21, 1944, Serial No. 527,386

2 Claims. (Cl. 121—142)

This invention relates to reciprocating engines or motors utilizing a pressure fluid, as air or steam, preferably air. It has for its object a pressure fluid operated reversing valve timed by the movement of the piston of the motor or the position of the piston in the cylinder, whereby mechanical reversing mechanism between the piston, or any part operated thereby, and the reversing valve member is dispensed with.

It further has for its object a valve operable to start the motor by motive fluid by-passed around the reversing valve to let motive fluid in one end of the cylinder independently of the reversing valve, whereby the engine is started in case it stops with the reversing valve in intermediate position, said control valve being movable from stop to running position and passing through an intermediate starting position, when shifted from stop to running position.

The invention consists in the novel features and in the combinations and constructions hereinafter set forth and claimed.

In describing this invention, reference is had to the accompanying drawings, in which like characters designate corresponding parts in all the views.

Figure 1:
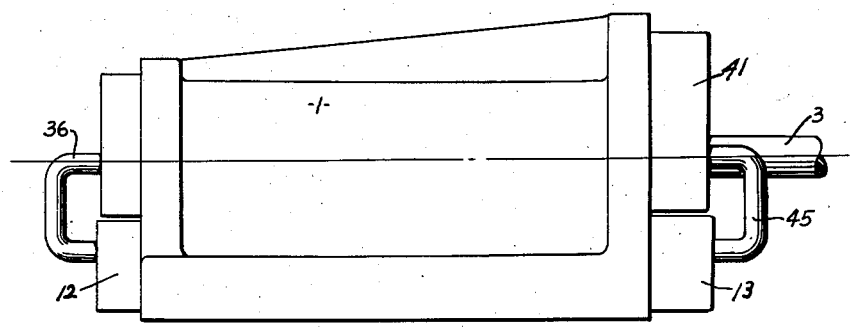
Figure 1 is a longitudinal side elevation of a motor embodying this invention.
Figure 2:
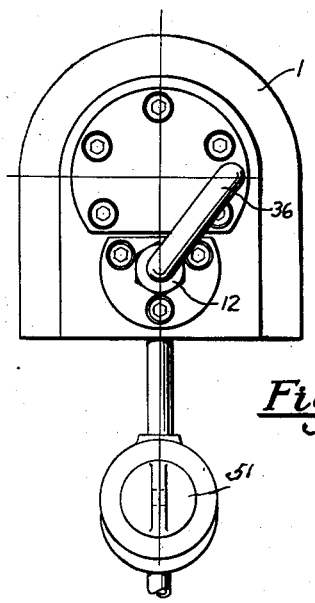
Figures 2 and 3 are end elevations looking to the right and left respectively in Figure 1.
Figure 3:
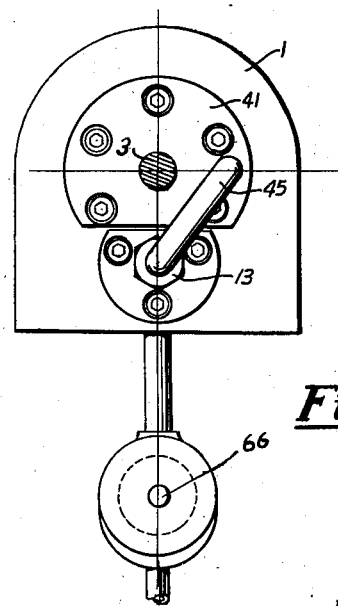

The motor here illustrated comprises a cylinder, a double acting piston in the cylinder and a reversing valve for controlling the flow of motive fluid alternately to the cylinder on opposite sides of the piston and the exhaust of motive fluid therefrom with said reversing valve operated by motive fluid instead of mechanically, which motive fluid passes from the cylinder on opposite sides of the piston to pressure operated devices for operating the reversing valve in opposite directions, the flow of motive fluid from the cylinder to the actuating devices for the reversing valve being timed by the piston during its travel, or in other words, the position of the piston determines to which of the pressure operated devices the motive fluid flows. The release of the motive fluid from the pressure device is also controlled and timed by the piston.

The engine here illustrated is designed to use air as a motive fluid.

1 designates the cylinder and 2 the piston in the cylinder, this having its rod 3 extending axially through one end or head of the cylinder. The rod 3 may be connected to a crank shaft in the usual manner or to the movable member of a pump, as a vacuum pump, and when connected to the pump, it is connected directly to the piston rod of the pump. The piston is shown as single with pressure faces on opposite ends thereof.

4 designates the reversing valve, this being here shown as a slide valve or rod mountable in a suitable bore 5 in the body or casting of the cylinder parallel to the axis of the cylinder, the valve rod having pressure faces 6 and 7 at its opposite ends presented in pressure chambers 8 and 9 respectively of the pressure operated devices. The chambers 8 and 9 are here shown as formed in tubular members or bushings 10 and 11 fitted into the ends of the bore 5, the outer ends of these tubular members or bushings 10, 11 being closed by plugs or glands 12, 13 having axial ports or passages 14 and 15 therein for the intake and exhaust of the motive fluid. The valve rod 4 is provided with ports, as circumferential grooves 16 and 17, the port 16 communicating alternately with the intake port 18 and exhaust port 20 of one end, as the left hand end, of the cylinder 1 and the port or groove 17 communicating alternately with the intake port 19 and exhaust port 21 of the other or right hand end of the cylinder 1. The groove or port 16 communicates with its inlet port 18, when the groove or port 17 communicates with the exhaust port 21. The cylinder is also provided with ports 22 and 23 paired with the ports 18 and 19, respectively, and which communicate through suitable branch conduits 24, 25 with a feed line 26 through a control or starting and stopping valve. Also, the cylinder body around the valve 4 is formed with exhaust ports 28 and 29 paired with the exhaust ports 20 and 21. The ports 18—20 and 22—28 and the ports 19—21 and 23—29 also open through the tubular members 10 and 11 in order to register with the ports or grooves 16, 17 of the valve rod.

Figure 4:
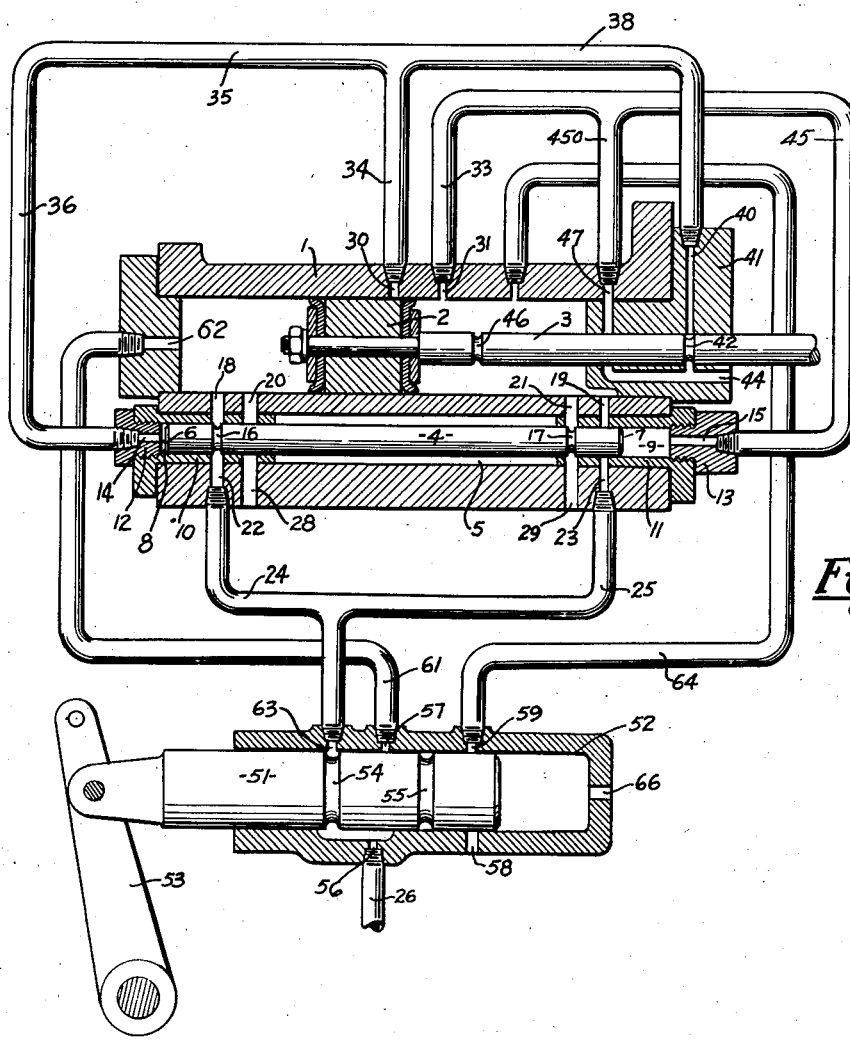
Figure 4 is a longitudinal sectional, partly diagrammatic, view of the motor and the control or starting valve, the same being shown as in running position.

The cylinder is formed with ports 30 and 31 arranged to be uncovered by the piston 2 when at the end of its power stroke to the right and when at the end of its power stroke to the left respectively, so that when the port 30 is uncovered, air under pressure passes from the cylinder through the port 30 and conduits 34, 35 and 36 to the plug or coupling 12 or the passage 14 thereof to the pressure chamber 8 to shift the reversing valve 4 to the right. The conduit 34 is also connected by a pipe 38 to a port 40 in a packing or bushing 41 fitted into one end, as the right hand end of the cylinder, which port 40 comes in line with a passage 42, as a circumferential groove in the piston rod 3 when the piston 2 is at the start of its power stroke from left to right, to exhaust the air from the chamber 8. The passage or groove 42 communicates with exhaust ports 40, 44 communicating through openings or ports in the stuffing box or tubular member 41 around the piston rod 3. When the piston reaches the end of its power stroke to the right and uncovers the port 30, the reversing valve 4 is operated to the right to close the intake port 18 and open the exhaust port 20, and open the intake port 19 and close the exhaust port 21 for the right end of the cylinder 1. The port 31 is uncovered by the piston 2, when the piston is at the end of its power stroke to the left. When so uncovered, air passes from the right end of the cylinder through port 31, conduits 33, 45 to the pressure chamber 9 through port 15, and shifts the reversing valve 4 to the left, closing the inlet port 19 at the right end of the cylinder 1 to the inlet of air and opening the exhaust port 21 and also opening the inlet port 18 at the left end of the cylinder and closing the exhaust port 20. The movement of the piston on its power stroke to the right brings the passage or groove 46 in the piston rod into register with the exhaust port 47, when the piston 2 approaches or reaches the end of its power stroke to the right, permitting the air to exhaust from the chamber 9 through port 15, conduits 45, 45a, and ports 47, 44, and hence permit the valve 4 to reverse from left to right under the air coming into the chamber 8, as before described. When the piston approaches or reaches the end of the power stroke to the left and uncovers the port 31, air passes through the port 31, conduits 33, 45, to the pressure chamber 9 and reverses the valve 4 to the left when the port or groove 42 in the piston rod 3 again registers with the port 40 and opens the chamber 8 to the exhaust of air through conduits 36, 34, 38, ports 40, 42 and 44. Thus, during repeated operations, the reversing valve is operated or reversed by air pressure taken from one end or the other of the cylinder, and mechanical connections are avoided. Most of the pipes shown diagrammatically in Figure 4 are actually bores in the cylinder block 1.

Figure 5:
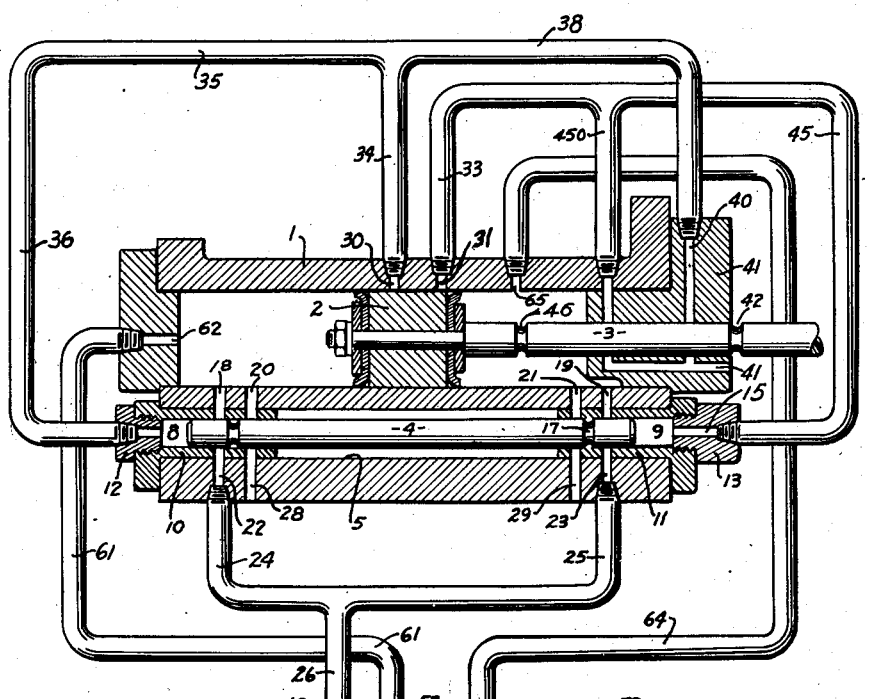
Figure 5 is a view similar to Figure 4 with the control valve and the motor in starting position.
Figure 6:
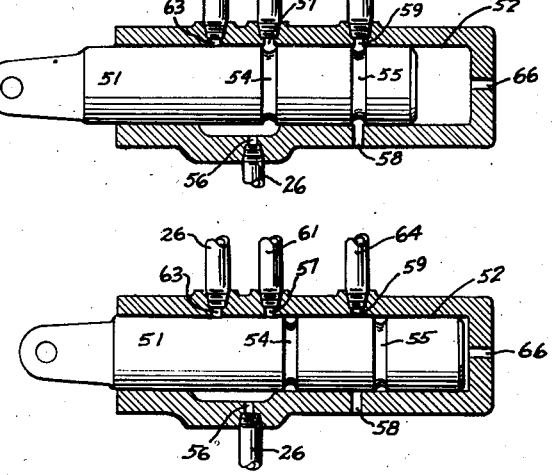
Figure 6 is a longitudinal sectional view of the control valve showing it in stop position.

As the engine may stop when the power is cut off with the reversing valve in an intermediate position, so that the engine is stalled against starting, a starting valve is provided which is manually or operator operated from stop position to running position through an intermediate starting position, and when in intermediate starting position opens one end of the cylinder to air from the feed line by passing around the reversing valve, so that the piston is actuated in one direction, and when it completes its power stroke in that direction, locates the reversing valve in proper sequence. This starting valve for the purpose of illustration is shown as a sliding piston 51 mounted in a bore in the body 52 of the cylinder, the piston being shiftable by a suitable lever, as 53, into three positions, the stop position being shown in Figure 6, the start position in Figure 5, and running position in Figure 4. The valve 51 is provided with ports or transfer passages 54, 55 which register with ports as follows: When the valve is in stop position (Figure 6), these transfer passages are out of register with all ports. When shifted through starting position, as shown in Figure 5, the transfer passages 54, 55 are in register respectively with ports 56, 57 and 58. The port 56 is connected in the main feed line 26 between the branches 24, 25 and the port 57 is connected by a pipe 61 to a port 62 in one head, as the left head of the cylinder 1. Hence, when the control valve is shifted from stop and is passing through the intermediate start position, air can pass from the main line 26, port 56, transfer passage 54 of the valve, port 57, conduit 61 to the left end of the cylinder, actuating the piston 2 on its power stroke to the right. When in so doing, it uncovers the port 30 and the reversing valve 4 will be actuated if it is out of place, as seen in Figure 5, into proper position. This first stroke of the piston occurs while the starting valve 51 is passing from starting position into running position (Figure 4). When in running position, the transfer passage 54 connects the port 56 and the port 63 with the feed line 26 through the branches 24, 25 and the reversing valve. When the control valve 51 is in starting position, the transfer passage 55 is in line or registers with the ports 58, 59. The port 58 exhausts to the outer air. The port 59 is connected by a conduit 64 to an exhaust port 65 for the right end of the cylinder 1. The bore or casing for the valve 51 has a suitable vent passage 66 for preventing it from becoming air-bound.

Thus, in starting the engine, regardless of in what position it is stopped, the movement of the starting valve 51 by the lever 53 from stop through start to running position effects the initial power stroke of the piston and after the engine is thus started, the control is taken over by the reversing valve 4. In the event the engine should stop when the piston is at the limit of its stroke to the right, the air passing through the valve 51, when in starting position, would pass out through the port 30 and reverse the reversing valve 4, so that when the starting valve reached running position, the air would pass through the reversing valve to the right hand end of the cylinder 1 to actuate the piston 2 to the left in the regular manner.

What I claim is:

1. In a double acting reciprocating motor, the combination with a cylinder, a piston in the cylinder having a piston rod and a reversing valve for controlling the flow of motive fluid alternately to the cylinder on opposite sides of the piston and the exhaust of motive fluid therefrom; of pressure chambers associated with the valve member and operable to shift the valve member in opposite directions, said cylinder having ports arranged to be uncovered by the piston when at either end of its power stroke, one port being located to be uncovered when the piston is at the end of its power stroke in one direction and the other one when at the end of its power stroke in the opposite direction, conduits connecting said ports and said pressure chambers, and a valve in the feed line for the motive fluid and connected to the cylinder on opposite sides of the piston and having stop and run positions and a starting position between the stop and run positions, a conduit connecting the valve and the cylinder on one side of the piston only to control the flow of air to the cylinder and a conduit on the other side of the cylinder to the exhaust of air through the valve, whereby the motor is started independently of the position of the reversing valve when the reversing valve stops intermediate of its operating movement.

2. In a double acting reciprocating motor, the combination with a cylinder, a piston in the cylinder having a piston rod and a reversing valve for controlling the flow of motive fluid alternately to the cylinder on opposite sides of the piston and the exhaust of motive fluid therefrom; of pressure chambers associated with the valve member and operable to shift the valve member in opposite directions, said cylinder having ports arranged to be uncovered by the piston when at either end of its power stroke, one port being located to be uncovered when the piston is at the end of its power stroke in one direction and the other one when at the end of its power stroke in the opposite direction, conduits connecting said ports and said pressure chambers, exhaust ports in communication with said pressure chambers respectively, the piston rod closing the last ports and having transfer ports located to time the opening of the last ports and open them alternately, and a valve in the feed line for the motive fluid and connected to the cylinder on opposite sides of the piston and having stop and run positions and a starting position between the stop and run positions, a conduit connecting the valve and the cylinder on one side of the piston only to control the flow of air to the cylinder, and a conduit on the other side of the cylinder to the exhaust of air through the valve, whereby the motor is started independently of the position of the reversing valve when the reversing valve stops intermediate of its operating movement.

RUDOLPH R. KILIAN.